United States Patent
Wyatt, Jr. et al.

(10) Patent No.: US 8,435,452 B2
(45) Date of Patent: May 7, 2013

(54) CIRCULATING FLUID BED REACTOR WITH IMPROVED CIRCULATION

(75) Inventors: John T. Wyatt, Jr., Alexandria, VA (US); E. Nicholas Jones, Centreville, VA (US); Alvin U. Chen, Reston, VA (US); Clay R. Sutton, Redondo Beach, CA (US); Timothy M. Healy, Centreville, VA (US); Ronald Suryo, Fairfax, VA (US); Len Lampert, Calgary (CA); Jonathan Miller, Washington, DC (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 91 days.

(21) Appl. No.: 13/029,608

(22) Filed: Feb. 17, 2011

(65) Prior Publication Data

US 2011/0206563 A1    Aug. 25, 2011

Related U.S. Application Data

(60) Provisional application No. 61/307,210, filed on Feb. 23, 2010.

(51) Int. Cl.
| | |
|---|---|
| *F27B 15/08* | (2006.01) |
| *F27B 15/00* | (2006.01) |
| *B01J 8/18* | (2006.01) |
| *B01J 19/00* | (2006.01) |
| *B01J 8/02* | (2006.01) |
| *B01J 35/02* | (2006.01) |
| *C10B 55/00* | (2006.01) |
| *C10G 1/00* | (2006.01) |
| *C10G 47/00* | (2006.01) |
| *C10G 11/00* | (2006.01) |
| *C10G 9/28* | (2006.01) |
| *C10G 9/32* | (2006.01) |
| *C10G 9/42* | (2006.01) |

(52) U.S. Cl.
USPC ........... 422/145; 422/129; 422/139; 422/211; 422/213; 422/215; 422/224; 208/50; 208/106; 208/107; 208/113; 208/125; 208/127

(58) Field of Classification Search .................. 422/129, 422/139, 145, 211, 213, 215, 224; 208/46, 208/49, 50, 53, 106, 107, 113, 125, 126, 208/127, 146, 153, 163
See application file for complete search history.

(56) References Cited

U.S. PATENT DOCUMENTS

| | | | |
|---|---|---|---|
| 2,927,073 | A | 3/1960 | Moser, Jr. et al. |
| 4,097,361 | A | 6/1978 | Ashworth |

(Continued)

OTHER PUBLICATIONS

PCT/US2011/025656, PCT International Search Report, Form PCT/ISA/210, dated May 19, 2011, 3 pgs.

(Continued)

*Primary Examiner* — Walter D Griffin
*Assistant Examiner* — Natasha Young
(74) *Attorney, Agent, or Firm* — Malcolm D. Keen; Glenn T. Barrett

(57) ABSTRACT

A circulating fluid bed reactor such as that used in fluid coking processes has a circular dense bed reaction section above the reactor base where the fluidizing gas is injected and a plurality of frusto-conical baffles in the dense bed reaction section, each of which depends downwardly and radially inwards from the reactor wall to a lower, inner edge defining a central aperture. The baffles are preferably provided with downcomers which permit downward flow of solids and upward flow of gas through the baffles.

17 Claims, 2 Drawing Sheets

U.S. PATENT DOCUMENTS

| | | | |
|---|---|---|---|
| 4,379,046 A * | 4/1983 | Oldweiler | 208/54 |
| 4,587,010 A * | 5/1986 | Blaser et al. | 208/127 |
| 4,615,870 A * | 10/1986 | Armstrong et al. | 422/604 |
| 4,714,541 A * | 12/1987 | Buyan et al. | 208/161 |
| 5,430,222 A * | 7/1995 | Fersing et al. | 585/800 |
| 5,531,884 A * | 7/1996 | Johnson et al. | 208/150 |
| 6,585,883 B1 * | 7/2003 | Kelemen et al. | 208/48 AA |
| 7,993,593 B2 * | 8/2011 | Sato et al. | 422/131 |
| 2006/0021909 A1 * | 2/2006 | Cerqueira et al. | 208/113 |
| 2006/0147355 A1 | 7/2006 | Beech, Jr. et al. | |

OTHER PUBLICATIONS

PCT/US2011/025656, PCT Written Opinion of the International Searching Authority, Form PCT/ISA/237, dated May 19, 2011, 4 pgs.

Hsiaotao Bi et al., "Flooding Of Gas-Solids Countercurrent Flow In Fluidized Beds", Industrial Engineering Chemical Research, 2004, vol. 43, pp. 5611-5619.

* cited by examiner

CIRCULATING FLUID BED REACTOR WITH IMPROVED CIRCULATION

CROSS REFERENCE TO RELATED APPLICATIONS

This application relates and claims priority to U.S. Provisional Patent Application No. 61/307,210 filed on Feb. 23, 2010.

FIELD OF THE INVENTION

This invention relates to a circulating fluid bed reactor with an improved circulation pattern. It relates more particularly to fluid coking reactors with improved circulation and reduced fouling characteristics.

BACKGROUND OF THE INVENTION

Circulating fluid bed (CFB) reactors are well known devices that can be used to carry out a variety of multiphase chemical reactions. In this type of reactor, a fluid (gas or liquid) is passed through a granular solid material at velocities high enough to suspend the solid and cause it to behave as though it were a fluid. Fluidization is maintained by means of fluidizing gas such as air, steam or reactant gas injected through a distributor (grid, spargers or other means) at the base of the reactor. CFB reactors are now used in many industrial applications, among which are catalytic cracking of petroleum heavy oils, olefin polymerization, coal gasification, and water and waste treatment. One major utility is in the field of circulating fluid bed combustors where coal or another high sulfur fuel is burned in the presence of limestone to reduce SOx emissions; emissions of nitrogen oxides is also reduced as a result of the relatively lower temperatures attained in the bed. Another application is in the fluidized bed coking processes known as fluid coking and its variant, Flexicoking™, both of which were developed by Exxon Research and Engineering Company.

Fluidized bed coking is a petroleum refining process in which heavy petroleum feeds, typically the non-distillable residue (resid) from fractionation, are converted to lighter, more useful products by thermal decomposition (coking) at elevated reaction temperatures, typically about 480 to 590° C., (about 900 to 1100° F.). The process is carried out in a unit with a large reactor vessel containing hot coke particles which are maintained in the fluidized condition at the required reaction temperature with steam injected at the bottom of the vessel with the average direction of movement of the coke particles being downwards through the bed. The heavy oil feed is heated to a pumpable temperature, mixed with atomizing steam, and fed through multiple feed nozzles arranged at several successive levels in the reactor. The steam is injected into a stripper section at the bottom of the reactor and passes upwards through the coke particles in the stripper as they descend from the main part of the reactor above. A part of the feed liquid coats the coke particles in the fluidized bed and subsequently decomposes into layers of solid coke and lighter products which evolve as gas or vaporized liquid. The light hydrocarbon products of the coking (thermal cracking) reactions vaporize, mix with the fluidizing steam and pass upwardly through the fluidized bed into a dilute phase zone above the dense fluidized bed of coke particles. This mixture of vaporized hydrocarbon products formed in the coking reactions continues to flow upwardly through the dilute phase with the steam at superficial velocities of about 1 to 2 meters per second (about 3 to 6 feet per second), entraining some fine solid particles of coke. Most of the entrained solids are separated from the gas phase by centrifugal force in one or more cyclone separators, and are returned to the dense fluidized bed by gravity through the cyclone diplegs. The mixture of steam and hydrocarbon vapor from the reactor is subsequently discharged from the cyclone gas outlets into a scrubber section in a plenum located above the reaction section and separated from it by a partition. It is quenched in the scrubber section by contact with liquid descending over scrubber sheds in a scrubber section. A pump around loop circulates condensed liquid to an external cooler and back to the top row of scrubber section to provide cooling for the quench and condensation of the heaviest fraction of the liquid product. This heavy fraction is typically recycled to extinction by feeding back to the fluidized bed reaction zone.

Components of the feed that are not immediately vaporized coat the coke particles in the reactor and are subsequently decomposed into layers of solid coke and lighter products which evolve as gas or vaporized liquids. During the contacting of the feed with the fluidized bed, some coke particles may become unevenly or too heavily coated with feed and during collision with other coke particles may stick together. These heavier coke particles may not be efficiently fluidized by the steam injected into the bottom of stripper section so that they subsequently pass downwards from the reactor section into the stripper section where they may adhere to and build up on the sheds in the stripper section, mainly on the uppermost rows of sheds. Conventionally, the stripper section has a number of baffles, usually termed "sheds" from their shape in the form of inverted channel sections extending longitudinally in several superimposed rows or tiers across the body of the stripper. The coke passes over these sheds during its downward passage through the stripper and is exposed to the steam which enters from the spargers at the bottom of the vessel below the sheds and is redistributed as it moves up the stripper. The solid coke from the reactor, consisting mainly of carbon with lesser amounts of hydrogen, sulfur, nitrogen, and traces of vanadium, nickel, iron, and other elements derived from the feed, passes through the stripper and out of the reactor vessel to a burner where it is partly burned in a fluidized bed with air to raise its temperature from about 480 to 700° C. (about 900° to 1300° F.), after which the hot coke particles are recirculated to the fluidized bed reaction zone to provide the heat for the coking reactions and to act as nuclei for the coke formation.

The Flexicoking™ process, also developed by Exxon Research and Engineering Company, is, in fact, a fluid coking process that is operated in a unit including a reactor and burner, often referred to as a heater in this variant of the process, as described above but also including a gasifier for gasifying the coke product by reaction with an air/steam mixture to form a low heating value fuel gas. The heater, in this case, is operated with an oxygen depleted environment. The gasifier product gas, containing entrained coke particles, is returned to the heater to provide a portion of the reactor heat requirement. A return stream of coke sent from the gasifier to the heater provides the remainder of the heat requirement. Hot coke gas leaving the heater is used to generate high-pressure steam before being processed for cleanup. The coke product is continuously removed from the reactor. In view of the similarity between the Flexicoking process and the fluid coking process, the term "fluid coking" is used in this specification to refer to and comprehend both fluid coking and Flexicoking except when a differentiation is required.

The stripping section of the fluid coking unit is located in the lower portion of the reactor. Coke particles from the reactor pass into the stripper where they are contacted with stripping steam from a sparger located at the bottom of the stripping section in order to remove hydrocarbon vapor phase products from the coke which is carried out of the bottom of the unit. As a result of the well-mixed nature of the reactor, a certain amount of coke entering the stripper is still coated with crackable hydrocarbon material. For this material, the stripper acts as an additional reaction section within which cracking and drying can occur. As this material progresses through the stripper, additional cracking reactions occur. For this reason, plug flow behavior is extremely desirable in the stripper in order to minimize the amount of crackable material sent to the burner or heater as hydrocarbon carry under, where it is effectively downgraded to coke. With basic fluid cokers, unlike Flexicokers, this phenomenon is not greatly disadvantageous as the quantities are small but in the case of Flexicokers, this material is sent to the heater, where it is exposed to a high temperature, oxygen poor environment. Unreacted material that enters the heater can crack to form a full range of vapor phase products. These products are then carried up into the heater overhead where they can condense onto surfaces resulting in capacity and/or run length limitations.

While hydrocarbon carry under is not a major concern for fluid coking units, these units do experience a different type of concern arising from operation of the stripper. Accumulation of deposits on the stripper sheds, which typically take on a characteristic shape by which they are named "shark fins", makes the stripper vulnerable to reduced clearances that can interrupt the coke circulation in the stripper section, restrict fluidization of the coke in the reactor section and trap rubble spelled during a thermal cycle. If sufficiently large, the shark fins and can eventually lead to unplanned capacity loss or an unplanned reactor shutdown.

The dense fluid bed behaves generally as a well mixed reactor. However computational fluid dynamics model simulations and tracer studies have shown that significant amounts of wetted coke can rapidly bypass the reaction section and contact the stripper sheds. The mechanism postulated for the formation of the coke deposits is that a thin film of liquid (unconverted and partially converted feed material) on the coke causes the coke particle to stick loosely to other particles and/or the stripper shed surface. A portion of the wet film is converted to coke, binding the coke particles together. Over time, hydrocarbon species from the vapor phase condense in the interstices between the particles, creating deposits which are very hard and difficult to remove.

Current practice in fluid coking units is to raise reactor temperatures to accelerate the thermal cracking reactions. This enables the coke to dry more quickly and thereby reduce the amount of wetted coke that enters the stripper. However the higher reactor temperature increases the rate of recracking of the hydrocarbon vapors and reduces the C4+ liquid yield resulting in an economic debit.

Other attempts have previously been made to overcome this problem with varying degrees of success. For example, strippers have been fitted with steam spargers located underneath the stripper sheds, as reported by Hsiaotao Bi et al in "*Flooding of Gas-Solids Countercurrent Flow in Fluidized Beds*", In Eng. Chem. Res. 2004, 43, 5611-5619. Sheds with apertures at set intervals have also been used, with spargers supplying a constant steam flow to the holes to reduce fouling.

SUMMARY OF THE INVENTION

We have now devised an improved configuration for circulating fluid bed reactors in which fouling of the fluidizing gas distributor at the base of the reactor, whether by reactor feed components, reaction products or mixtures of reactor inerts with feed or reaction products, is a problem. This configuration is particularly useful in fluid coking reactors but is potentially useful in other CFB reactors where similar problems are encountered.

According to the present invention, a circulating fluid bed reactor has a dense bed reaction section of circular horizontal cross-section about a vertical axis confined by the reactor wall. The reactor has a base region where fluidizing gas in injected to fluidize a bed of finely-divided solid particles in the dense bed reaction section, an exit at the top through which gas and finely divided particulate solids exit the reactor as well as at least one frusto-conical staging baffle in the reaction section above the base of the reactor; the baffle or each of them depends from its upper edge at the reactor wall to extend downwards and radially inwards from the reactor wall to a lower, inner edge defining a central, circular aperture. These staging baffles typically extend downwards and inwards from the reactor wall at an angle of between 30° and 60° from the horizontal. Each baffle preferably covers an annular flow area of between 10 and 70% of the total reactor cross section at that elevation in the reactor. For best results, a plurality of the baffles is located at multiple elevations in the reactor dense bed above the base of the reactor.

In the preferred form used in fluid coking units, the reactor comprises:

a dense bed reaction section confined by the reactor wall, typically of frusto-conical configuration with its major cross-section uppermost, a base region below the dense bed reaction section at which fluidizing gas in injected to fluidize the dense bed of finely-divided solid coke particles in the dense bed reaction section, heavy oil inlets located around the periphery of the reactor wall at multiple elevations above the base region, a plenum or scrubber section above the dense bed reaction section and separated from the dense bed reaction section, cyclones at the top of the dense bed reaction section, each of which has a cyclone inlet for the flow of exiting gas and coke particles, a cyclone gas outlet exhausting into the plenum above the reaction section, and a cyclone dipleg for returning coke particles separated from the gas in the cyclone into the dense bed reaction section, a stripping section at the base region of the reactor comprising stripper sheds and spargers for stripping steam, a plurality of the frusto-conical baffles located at multiple elevations in the dense bed reactor section above the base region of the reactor.

The reactor will be coupled in the unit to a burner/heater by means of coke lines in the normal way: a cold coke transfer line takes coke from the bottom of the stripper to the burner/heater and a hot coke return line brings hot coke from the burner/heater back to the reactor. In the case of a Flexicoker, the gasifier section follows the heater vessel as described above.

DRAWINGS

DETAILED DESCRIPTION

Figure 1:
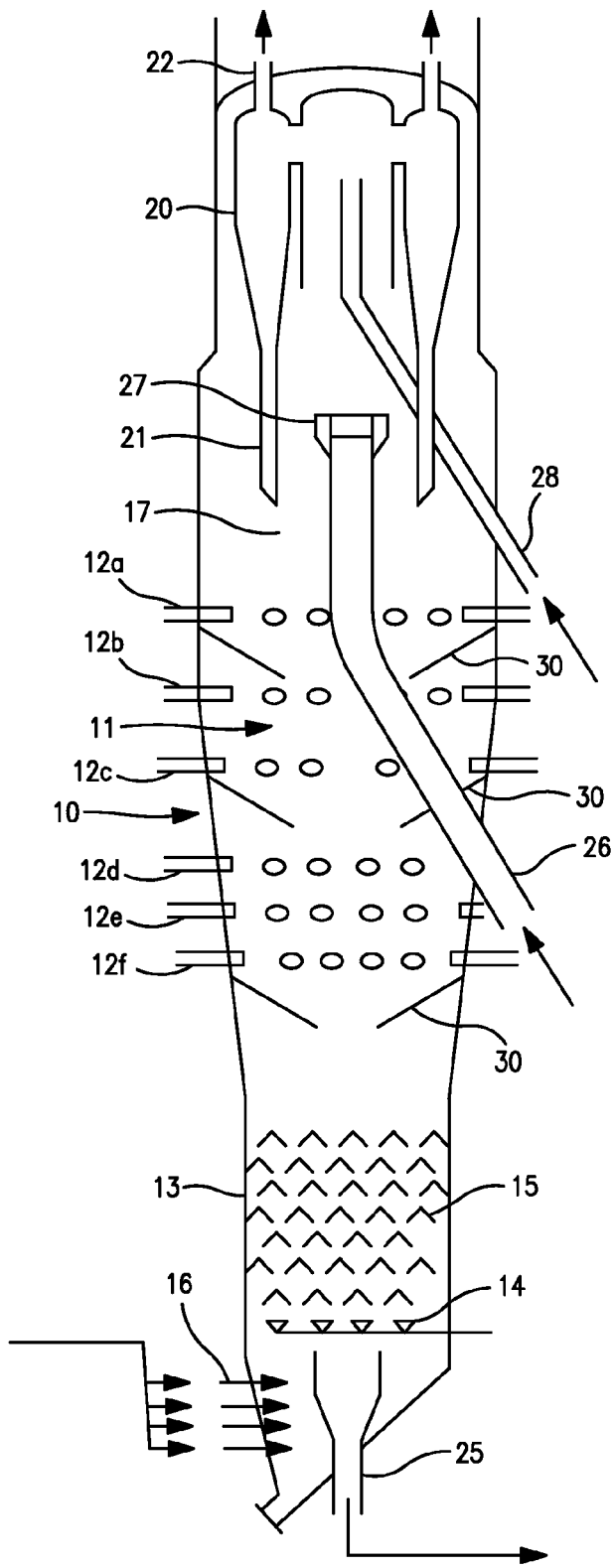
FIG. 1 is simplified diagram of a typical reactor of a fluid coking unit in vertical section incorporating the staging baffles.

In FIG. 1 which is a simplified diagram of the reactor of a fluid coking unit, the reactor coking zone 10 contains a dense phase fluidized bed 11 of heated seed coke particles into which the feedstock, heated to a temperature sufficient to initiate the coking (thermal cracking) reactions and deposit a fresh coke layer on the hot fluidized coke particles circulating in the bed is injected. The coking zone has a slight frusto-conical form with its major cross-section uppermost so that the gas decelerates towards the top of the reactor vessel; the upper portion of the vessel is typically cylindrical in shape. Typically, the feed is preheated by contact with the cracking vapors passing through the scrubber as described further below. The feed is injected through multiple nozzles located in feed rings 12a to 12f, which are positioned so that the feed with atomizing steam enters directly into the dense fluidized bed of hot coke particles in coking zone 11. Each feed ring consists of a set of nozzles (typically 10-20, not designated in FIG. 1) that are arranged around the circular periphery of the reactor wall at a given elevation with each nozzle in the ring connected to its own feed line which penetrates the vessel shell (i.e. 10-20 pipes extending into the fluid bed). These feed nozzles are typically arranged non-symmetrically around the reactor to optimize flow patterns inn the reactor according to simulation studies although symmetrical disposition of the nozzles is not precluded if the flow patterns in the reactor can be optimized in this way. There are typically 4-6 feed rings located at different elevations although not all may be active at any one time while the unit is working.

Steam is admitted as fluidizing gas in the stripping section 13 at the base of coker reactor 10, through spargers 14 directly under stripping sheds 15 as well as from lower inlets 16. The steam passes up into stripping zone 13 of the coking reactor in an amount sufficient to obtain a superficial fluidizing velocity in the coking zone, typically in the range of about 0.15 to 1.5 m/sec (about 0.5 to 5 ft/sec). The coking zone is typically maintained at temperatures in the range of 450 to 650° C. (about 840 to 1200° F.) and a pressure in the range of about 0 to 1000 kPag (about 0 to 145 psig), preferably about 30 to 300 kPag (about 5 to 45 psig), resulting in the characteristic conversion products which include a vapor fraction and coke which is deposited on the surface of the seed coke particles.

The vaporous products of the cracking reactions with entrained coke particles pass upwards out of the dense phase reaction zone 11, through a phase transition zone in the upper portion 17 of the vessel and finally, a dilute phase reaction zone at the inlets of cyclones 20 (only two shown, one indicated). The coke particles separated from the vaporous coking products in the cyclones are returned to the fluidized bed of coke particles through cyclone dipleg(s) 21 while the vapors pass out through the gas outlet(s) 22 of the cyclones into the scrubbing section of the reactor (not shown). After passing through scrubbing section which is fitted with scrubbing sheds in which the ascending vapors are directly contacted with a flow of fresh feed to condense higher boiling hydrocarbons in the reactor effluent (typically 525° C.+/975° F.+) and recycles these along with the fresh feed to the reactor. The vapors leaving the scrubber then pass to a product fractionator (not shown). In the product fractionator, the conversion products are fractionated into light streams such as naphtha, intermediate boiling streams such as light gas oils and heavy streams including product bottoms.

The coke particles that pass downwards from the dense bed 11 to stripper section 13 are partially stripped of occluded hydrocarbons in the stripper by use of a stripping gas, usually steam, which enters via spargers 14 and stripping steam inlets 15. The stripped coke particles are passed via line 25 to the heater (not shown) which is operated a temperature from about 40° to 200° C., preferably about 65° to 175° C., and more preferably about 65 to 120° C. in excess of the actual operating temperature of the coking zone. A portion of the stripped coke that is not burned to satisfy the heat requirements of the coking zone is recycled to the coking zone through coke return line 26, passing out of return line 26 through cap 27 to enter the reactor near the top of the reaction zone; the remaining portion is withdrawn from the heater as product coke. The cap on the top of the coke return line conveniently comprises an annular ring supported over the open top of the return line with a flat circular cap plate axially centered over the line and the annular ring and supported by the same spider structure supporting the annular ring. A preferred variation allows a smaller flow of hot coke from the heater to be admitted from a second return line 28 higher up in reactor 10 at a point in the dilute phase where it is all entrained into the cyclone inlet(s) as scouring coke to minimize coking of the reactor cyclones and the associated increase in the pressure drop. If the unit is a Flexicoking unit, the gasifier section follows the heater with flow connections for the coke, return coke and gas flows in the normal way.

Heavy petroleum feeds which may be treated in the fluid coking process include heavy hydrocarbonaceous oils, heavy and reduced petroleum crude oil, petroleum atmospheric distillation bottoms, petroleum vacuum distillation bottoms, or residuum, pitch, asphalt, bitumen, other heavy hydrocarbon residues, tar sand oil, shale oil, coal, coal slurries, liquid products derived from coal liquefaction processes, including coal liquefaction bottoms, and mixtures thereof. Such feeds will typically have a Conradson carbon content (ASTM D189-06e2) of at least about 5 wt. %, generally from about 5 to 50 wt. %. The preferred feed is a petroleum vacuum residuum (resid).

As shown in FIG. 1, staging baffles 30 extend radially inwards and downwards from their upper edges which are fixed to the reactor wall are of generally conical form with a central, circular aperture to permit downward flow of coke particles and upward flow of vapors and divide the reactor into an upper feed zone and a lower drying zone thereby minimizing the bypassing of wet solids to the stripper zone below. The baffles are preferably disposed at an angle of between 30 and 60° downwards from the horizontal. A convenient value for the angle of the baffle is 45° downwards from the horizontal. Each baffle typically covers an annular flow area which is between 10 and 70%, preferably 20 to 60%, e.g. about 50%, of the total reactor cross section at that elevation in the reactor (in the case of the conical form reactor shown in FIG. 1, the cross sectional area can be averaged between the elevations of the upper and lower baffle edges for the purposes of the calculation). For best results, a plurality of the baffles will be located at multiple elevations in the reactor dense bed above the base of the reactor with a single baffle located between successive feed rings. Typically, if located at multiple elevations in the reactor, the number of elevations will be at least two or three although if reactor height is adequate even four or more might be used. In a reactor having six feed rings, for example, the baffles may be located below rings 2, 4 and 6 (feed rings numbered from top down). The lowest baffle is, in any event, preferably located below the bottommost feed ring as shown in FIG. 1 and successive baffles are located between pairs of feed rings at higher levels. In one specific embodiment of the reactor, one baffle is situated below the lowest row of active feed nozzles. A majority (at least 50% and preferably at least 30%) of the feed is preferably injected at the intermediate levels of the dense bed, for example, in the six feed ring reactor in rings 2, 3 and 4 (from top down). Attrition steam is directed through sparger 15 below the bottom baffle in order to control the mean particle size of the circulating coke.

Each baffle is typically built up of segments each of which consists of a segmental, curved plate which is mounted on supports welded to the reactor shell; the gaps between the individual segments are sealed so as to form a continuous, frusto-conical surface extending from the reactor vessel wall inward to a radial location that defines a circle that has an area preferably equal to approximately 50% of the vessel cross sectional area (i.e. a diameter equal to approximately 70% of the reactor diameter at that level). If computational flow dynamics (CFD) or other studies indicate that a larger or smaller proportion of the reactor cross section should be taken up by the baffle in a particular reactor, e.g. 30% or 60%, of the reactor cross-sectional area, the size of the central aperture should be adjusted accordingly. In each case, CFD studies may be used to optimize baffle size relative to the reactor diameter and baffles inclination. Each plate extends inward and downward from the vessel wall at the selected angle, e.g. 45°, to the horizontal.

In order to promote drying of the coke particles, it may be desirable to provide a lip at the inner periphery of the baffle. This takes the form of an inward extension below and preferably merging smoothly into the downwardly sloping baffle surface. This extension may be directed horizontally or upwardly but usually not more than about 30° upwards so as not to create any pockets in which the coke can accumulate.

Figure 2:
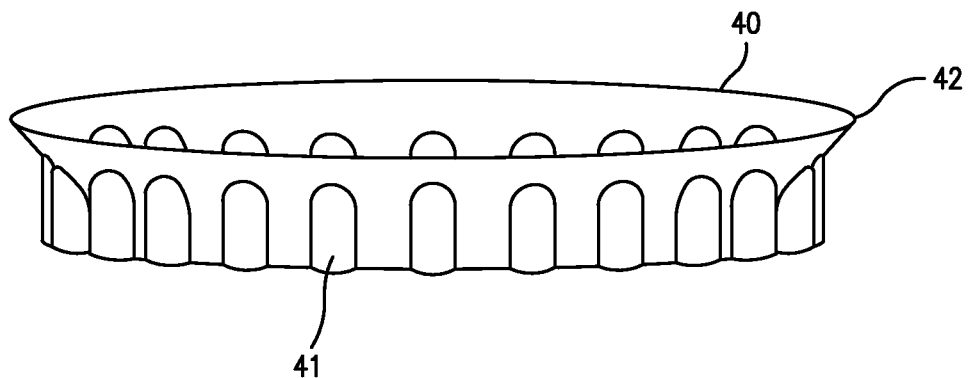
FIG. 2 shows a staging baffle with downcomers.
Figure 3:
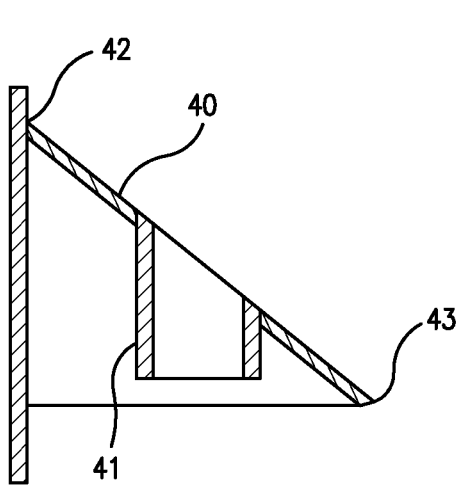
FIG. 3 shows a section through a portion of the baffle shown in FIG. 2.
Figure 4:
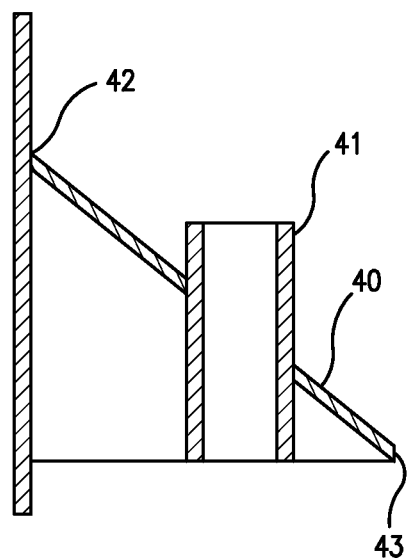
FIG. 4 shows a section through an alternative configuration for the top of the baffle downcomer.

Wet solids accumulation on the stripper internals has been found to be a key step in the formation of hard coke foulant: the liquid on the solids forms bridges that bind groups of particles to each other and to the reactor internals. Over time, hydrocarbon vapors permeate the interstices of the bound particles and react thermally to form hard coke deposits. Drier solids will be bound less strongly and accumulate less rapidly. Hence a key measure of fouling likelihood is the wetness of the solids that are entering the stripper. CFD studies have shown that the proportion of wet coke that is passed to the stripper can be further reduced by including downcomers in the baffles. In effect, the downcomers act to re-distribute the descending solids flow towards the periphery of the reactor and so inhibit channeling into the reactor central axis; they also allow steam to pass upwards near the periphery of the reactor to aerate the coke particles and reduce fouling on the baffles. In this configuration, shown in exemplary form in FIG. 2, the baffle 40 preferably includes a plurality of flow downcomers 41 (one only designated) which normally will be arranged evenly around the baffle between its upper, outer periphery 42 and its lower, inner edge 43 (not visible in FIG. 2 but see FIG. 3). Typically, the center of each downcomer will be located at a location between 20 and 80, preferably 40 to 60, e.g. 50, percent of the distance between the outer periphery of the baffle and its lower, inner edge. Each downcomer 41 is normally in the form of a vertical tube providing a flow passage through the baffle for descending solids. The top of the downcomer tube may be angled in the manner shown in FIG. 3 so that it is flush with the upper surface of the baffle, permitting the coke particles passing down over the surface of the baffle to enter the downcomer 41 more readily. Alternatively, the downcomer tubes may extend up above the surface of the baffle as shown in FIG. 4 and be terminated in a horizontal plane above the upper surface of the baffle. The downcomer typically extends below the baffle approximately as far as the elevation in the reactor at which the inner edge of the baffle terminates preferably within about 15 cm (6 inches), e.g. about 75 mm (3 inches), above or below this elevation. The diameter of the individual downcomers is typically in the range of about 10% to 70% of the horizontal distance from the vessel wall to the inner edge of the baffle (measured from the downward projection of the edges of the baffle and the downcomers and not along the sloping face of the baffle). In most cases, the diameter of the individual downcomers will be from 15 to 50%, preferably 25 to 50%, of the horizontal distance from the vessel wall to the inner edge of the baffle, for example, about 40% of this distance. The total area of the downcomers will typically be from about 10 to 50 percent of the individual baffle area and in most cases from 15 to 30 percent, e.g. about 20 percent of the individual baffle area. The diameter and length of the downcomers will vary is dependence upon the size of the unit; typically, the diameter of the downcomers will normally be in the range of about 25 to 120 cm. (about 10 to 48 inches) and in most cases, from about 60 to 100 cm (about 24 to 40 inches) in units with a diameter of about 10 to 12 meters at the relevant baffle elevation, with lengths of approximately 60 to 150 cm (about 24 to 59 inches), in most cases from about 85 to 130 cm (about 33 to 51 inches) for units of the same diameter, with the sizes being adjusted relatively for differently sized units. The bottom end of the downcomers is preferably located approximately level with the lower edge 43 of the baffle so as to bring the descending flow of coke particles into the turbulent flow region below the dead flow space between the underside of the baffle and the reactor wall.

As an alternative to the tubular downcomers, the baffle may be provided with apertures in the baffle, normally circular although elliptical apertures or slots will also achieve the same effect.

Examples 1-4

Modeling studies using a Computational Fluid Dynamics (CFD) Model of the fluid bed in a Flexicoking reactor were carried out. The results shown in Table compare the time average of liquid flux on wetted solids averaged over the cross section of the stripper (at the top of the stripper) for a fluid bed without a conical baffle and three embodiments of fluid beds with conical baffles. Also shown in Table 1 are the standard deviations of the time averaged flux. All of the fluxes are normalized to the amount of liquid on wetted solids determined for the case of no conical baffle.

TABLE 1

| Ex. | Reactor internal configuration | Normalized Solids Flux, Weighted Average Liquid Concentration on Solid | Deviation from Average |
|---|---|---|---|
| 1 | No Conical Baffle | 1.00 | ±0.25 |
| 2 | Single Conical Baffle, No downcomer | 0.83 | ±0.14 |
| 3 | Two Conical Baffles, No downcomer | 0.62 | ±0.07 |
| 4 | Single Conical Baffle 22 downcomers | 0.70 | ±0.07 |

Comparison of Example 1 with Example 2, 3 and 4 shows that the presence of one or more baffles, with or without downcomers reduces the likelihood of stripper fouling. Comparison of Examples 2 and 3 shows that increasing the number of baffles reduces the likelihood of fouling the stripper internals. Examples 2 and 4 show that downcomers improve the baffle performance.

Examples 5-6

In order to further evaluate the effect of the conical baffles in the fluid bed coking unit, a model was developed to evaluate the changes to unit yields (coke, liquids) caused by the baffles. The model used the results for the single and two baffle cases to determine the yield shifts. The results in Table 2 show changes in C5+ liquid yield and in coke yield as compared to the base case reactor, operating with no conical baffle present.

TABLE 2

| Reactor Configuration | Change in C5+ liquid yield from base, wt % | Change in coke yield from base, wt % |
|---|---|---|
| Single Baffle with downcomers | 1.0 | −1.5 |
| Two Baffles with downcomers | 0.2 | −1.0 |

Both reactor configurations with baffles present show an improvement in liquid yields and a decrease in coke make. These yield shifts are both directionally advantageous to the baffle design. The single baffle, based on its location in the reactor, shows better improvements to units liquids yields and a better reduction in coke make, than the two baffle case does. This is because the placement of the second baffle in relation to the feed nozzles may negatively affect reactor temperature and thereby reduce the effect of staging but an improvement over the base case is still achieved.

The invention claimed is:

1. A fluid coking reactor which comprises a dense bed reaction section of circular horizontal cross-section about a vertical axis and confined by a reactor wall in which bed a heavy oil feed is thermally cracked to form solid coke and vaporous cracking products, the reactor having:
    a base region at which fluidizing gas is injected to fluidize a bed of finely-divided solid coke particles in the dense bed reaction section,
    a plurality of heavy oil inlet rings located around the periphery of the reactor wall in the reaction section and at multiple elevations above the base region,
    a top region at which gas and finely divided particulate coke solids exit the reaction section,
    a plurality of the frusto-conical baffles located at multiple elevations in the dense bed reactor section above the base region of the reactor, each baffle being located between a successive pair of the heavy oil inlets rings and depending from an upper edge at the reactor wall to extend downwards and radially inwards from the reactor wall to a lower, inner edge defining a central aperture.

2. A reactor according to claim 1 in which each baffle depends from the reactor wall at an angle from 30° to 60° from the horizontal.

3. A reactor according to claim 1 in which each baffle depends from the reactor wall at an angle from 40° to 50° from the horizontal.

4. A reactor according to claim 1 in which each baffle covers an annular flow area of between 10% and 70% of the total reactor cross section at the average elevation in the reactor between the upper and lower edges of the baffle.

5. A reactor according to claim 4 in which each baffle covers an annular flow area of from 20% to 60% of the total reactor cross section at the average elevation in the reactor between the upper and lower edges of the baffle.

6. A reactor according to claim 5 in which each baffle covers an annular flow area from 25% to 40% of the total reactor cross section at the average elevation in the reactor between the upper and lower edges of the baffle.

7. A reactor according to claim 1 in which the dense bed reactor section has a frusto-conical configuration with its major cross-section uppermost.

8. A reactor according to claim 1 in which each baffle has a plurality of apertures in it to permit downward flow of particulate solids and upward flow of gas.

9. A reactor according to claim 1 in which each baffle includes a plurality of downcomers to permit downward flow of particulate solids and upward flow of gas, the downcomers being arranged uniformly around the baffle.

10. A reactor according to claim 1 which comprises a plurality of cyclones at the top region each having (i) a cyclone inlet for the flow of exiting gas and coke particles, (ii) a cyclone gas outlet in an isolated plenum above the reaction section and (iii) a cyclone dipleg for returning coke particles separated from the gas in the cyclone.

11. A reactor according to claim 1 which comprises a stripping section in the base region of the reactor, the stripping section comprising stripper sheds and spargers for stripping steam.

12. A reactor according to claim 1 in which each baffle has an inwardly extending lip at its inner edge of the baffle.

13. A fluid coking reactor which comprises:
    (i) a dense bed reaction section confined by a reactor wall of circular horizontal cross-section about a vertical axis and a frusto-conical configuration with its major cross-section uppermost, in which a heavy oil feed is thermally cracked to form solid coke and vaporous cracking products,
    (ii) a base region below the dense bed reaction section at which fluidizing gas is injected to fluidize a bed of finely-divided solid coke particles in the dense bed reaction section,
    (iii) a plurality of heavy oil inlet rings located around the periphery of the reactor wall in the dense bed reaction section and at multiple elevations above the base region,
    (iv) a plenum above the dense bed reaction section and separated from the dense bed reaction section,
    (v) a plurality of cyclones at the top of the reactor, each cyclone having a cyclone inlet for the flow of gas and coke particles exiting the reaction section, a cyclone gas outlet exhausting into the plenum above the reaction section, and a cyclone dipleg for returning coke particles separated from the gas in the cyclone into the dense bed reaction section,
    (vi) a stripping section at the base region of the reactor comprising stripper sheds and spargers for stripping steam,
    (vii) a plurality of frusto-conical baffles located at multiple elevations in the dense bed reactor section above the base region of the reactor, with each baffle located between a successive pair of the heavy oil inlet rings, each baffle having a central aperture and depending from its upper edge at the reactor wall to extend downwards and radially inwards from the reactor wall to a lower, inner edge defining the central aperture.

14. A reactor according to claim 13 in which each baffle depends from the reactor wall at an angle from 30° to 60° from the horizontal.

15. A reactor according to claim 13 in which each baffle covers an annular flow area of between 10% and 70% of the total reactor cross section at the average elevation in the reactor between the upper and lower edges of the baffle.

16. A reactor according to claim 13 in which each baffle includes a plurality of downcomers to permit downward flow of particulate solids and upward flow of gas, the downcomers being arranged uniformly around the baffle.

17. A reactor according to claim 13 in which each baffle has an inwardly extending lip at its inner edge of the baffle.

* * * * *